US012518079B1

(12) United States Patent
Sauter et al.

(10) Patent No.: US 12,518,079 B1
(45) Date of Patent: Jan. 6, 2026

(54) QUICK FLOORPLANNING TOOL

(71) Applicant: Marvell Asia Pte Ltd, Singapore (SG)

(72) Inventors: Christoph Sauter, Starksboro, VT (US); Mark William Kuemerle, Essex Junction, VT (US); Samer Michael Akiki, San Diego, CA (US); Wolfgang Sauter, Starksboro, VT (US); Eric William Tremble, Jericho, VT (US)

(73) Assignee: Marvell Asia Pte Ltd, Singapore (SG)

( * ) Notice: Subject to any disclaimer, the term of this patent is extended or adjusted under 35 U.S.C. 154(b) by 642 days.

(21) Appl. No.: 17/992,966

(22) Filed: Nov. 23, 2022

Related U.S. Application Data (60) Provisional application No. 63/282,571, filed on Nov. 23, 2021.

(51) Int. Cl.
*G06F 30/392* (2020.01)
*G06F 30/398* (2020.01)

(52) U.S. Cl.
CPC .......... *G06F 30/392* (2020.01); *G06F 30/398* (2020.01)

(58) Field of Classification Search
CPC ........ G06F 30/30; G06F 30/392; G06F 30/39; G06F 30/394; G06F 30/398; H10D 89/10
USPC ........................................................ 716/119
See application file for complete search history.

(56) References Cited

U.S. PATENT DOCUMENTS

2011/0167399 A1* 7/2011 Schroeder ............... G06F 30/30
716/122

OTHER PUBLICATIONS

Laskar et al., "A Survey on VLSI Floorplanning: Its Representation and Modern Approaches of Optimization," IEEE Sponsored 2nd International Conference on Innovations in Information, Embedded and Communication Systems (ICIIECS'15), pp. 1-9, year 2015.
Karthick, "A Strategy to Accelerate VLSI Various Leveled Physical Structure in Floor Planning," Journal of VLSI Design and Signal Processing, vol. 5, issue 2, pp. 1-8, year 2019.

* cited by examiner

*Primary Examiner* — Paul Dinh
(74) *Attorney, Agent, or Firm* — Meitar Patents Ltd.; Daniel Kligler (57) ABSTRACT

A system for designing placement locations for Input/Output (I/O) blocks in an electronic device is disclosed. The system includes an interface and a processor. The interface is configured to receive a requirement that specifies at least multiple I/O blocks to be laid-out along a periphery of an electronic device that implements a network communication device. The processor is configured to generate a plurality of candidate layouts for the electronic device, the candidate layouts differing from one another at least in an arrangement of the specified I/O blocks along the periphery, to estimate respective costs associated with at least some of the candidate layouts, and to present at least some of the candidate layouts and the respective estimated costs to a user.

20 Claims, 5 Drawing Sheets

QUICK FLOORPLANNING TOOL

CROSS-REFERENCE TO RELATED APPLICATIONS

This application claims the benefit of U.S. Provisional Patent Application 63/282,571, filed Nov. 23, 2021, whose disclosure is incorporated herein by reference.

FIELD OF THE DISCLOSURE

The present disclosure relates generally to integrated circuits, and particularly to the floorplanning stage of the physical design of an integrated circuit.

BACKGROUND

In: "A Survey on VLSI Floorplanning: Its Representation and Modern Approaches of Optimization", Lasker et. al., IEEE Sponsored 2nd International Conference on Innovations in Information Embedded and Communication Systems (2015), the authors assert that floorplanning is an essential step in the VLSI Physical Design Stage, as it is an effective means to manage circuit design complexity. Floorplanning involves determining the locations, shape, size of modules in a chip and as such it estimates the chip area, delay and the wiring congestion, thereby providing a groundwork for layout. Computationally, it is a Nondeterministic-Polynomial (NP) problem. Many researchers have suggested various heuristics and metaheuristic approaches for solving the VLSI Floorplan Problem. The Floorplan representation is another important aspect of the Floorplanning Stage. Representations have a great impact on the complexity of the Floorplan design. In the above paper, the authors survey the VLSI Floorplanning problem which includes studying and comparing the different optimization algorithms and the representations involved in the VLSI Floorplanning problem. Additionally, the authors suggest some of the new approaches for solving the floorplanning problem which have not yet been employed in this regard.

In "A Strategy to Accelerate VLSI Various Leveled Physical Structure in Floor Planning", Karthick S., Journal of VLSI Design and Signal Processing, Volume 5 Issue 2 (24 Apr. 2019), the author presents an effective model for brisk floor planning in VLSI top-down various leveled physical structure stream utilizing the active-logic reduction technology. The active-logic reduced representation replaces some unique modules in netlist record with filling units which have no sensible associations. This technique can successfully decrease interior coherent units and can rapidly forecast whether chip configuration accomplishes timing conclusion after best and least-squares execution with a given floorplan to rapidly pass judgment on the floorplan's quality.

SUMMARY

An embodiment that is described herein provides a system for designing placement locations for Input/Output (I/O) blocks in an electronic device. The system includes an interface and a processor. The interface is configured to receive a requirement that specifies at least multiple I/O blocks to be laid-out along a periphery of an electronic device that implements a network communication device. The processor is configured to generate a plurality of candidate layouts for the electronic device, the candidate layouts differing from one another at least in an arrangement of the specified I/O blocks along the periphery, to estimate respective costs associated with at least some of the candidate layouts, and to present at least some of the candidate layouts and the respective estimated costs to a user.

In some embodiments, the I/O blocks are of multiple types, and the interface is configured to receive, for each type among the types, (i) a respective size of the I/O blocks of the type and (ii) a respective count of the I/O blocks of the type to be laid-out. In a disclosed embodiment, the requirement further specifies a minimal size of an interior of the electronic device, and the processor is configured to generate the candidate layouts with interiors that meet the specified minimal size. In an example embodiment, the processor is configured to generate two or more subsets of the candidate layouts, the subsets differing from one another in an aspect ratio of the electronic device.

In some embodiments, the periphery includes one or two first edges of the device along a first axis, and one or two second edges of the device along a second axis that is perpendicular to the first axis, and, in generating a given candidate layout, the processor is configured initially to populate the one or two first edges with selected ones of the I/O blocks, and subsequently to populate the one or two second edges with remaining I/O blocks. In an embodiment, the processor is configured to populate the one or two first edges until the one or two first edges are fully populated with the selected I/O blocks, and then proceed to populate the one or two second edges with the remaining I/O blocks.

In another embodiment, the processor is configured to verify whether a given candidate layout passes a validity check, and, if the given candidate layout fails the validity check, to iteratively modify a parameter of the given candidate layout so as to meet the validity check.

In some embodiments, the processor is further configured to select respective package types for the candidate layouts, and to estimate the respective costs as sum costs of the candidate layouts and the respective package types. In an embodiment, the processor is configured to select a package type for a given candidate layout by determining a minimal package size that accommodates electrical interconnections required by the I/O blocks laid-out in the given candidate layout. In another embodiment, the processor is configured to identify a subset of the candidate layouts and respective package types having lowest sum costs.

There is additionally provided, in accordance with an embodiment that is described herein, a method for designing placement locations for I/O blocks in an electronic device. The method includes receiving a requirement that specifies at least multiple I/O blocks to be laid-out along a periphery of an electronic device that implements a network communication device. Multiple candidate layouts are generated for the electronic device, the candidate layouts differing from one another at least in an arrangement of the specified I/O blocks along the periphery. Respective costs, associated with at least some of the candidate layouts, are estimated. At least some of the candidate layouts and the respective estimated costs are presented to a user.

The present disclosure will be more fully understood from the following detailed description of the embodiments thereof, taken together with the drawings in which:

DETAILED DESCRIPTION OF EMBODIMENTS

Typically, IC physical design starts with a Request for Information (RFI) from a customer that defines: (i) IC contents—in the form of a zone in the center of the IC that is provided by the customer; and (ii) Interface blocks (also referred to as Input/Output (I/O) blocks) that fill the periphery of the IC.

In most cases, the parameter to be optimized (e.g., minimized) is the total monetary cost of the IC, typically including a combination of die costs and package costs. For a given process technology, the die cost is driven almost exclusively by the IC area and therefore is extremely dependent on an optimized layout. The package cost is mostly pre-determined by the IC layout. Conventional physical design tools typically either optimize the die size or the package cost, but not both.

Traditionally, the die size process is manual and extremely labor intensive: Interface blocks are manually placed around the edges of the IC and moved around until they fit. With the definition of the IC floorplan, most of the package elements are already defined and, thus, die floor-planning should consider package size as well as die size, and optimize for the sum of die and package cost.

Embodiments that are disclosed herein provide for a floorplanning tool that automatically optimizes both the die layout and the selected package, for a minimal sum of die cost and package cost. In a typical scenario, the disclosed floorplanning process is performed as a preparatory stage before embarking on a detailed place-and-route process of the IC.

The embodiments described herein are described in the context of designing integrated circuits (ICs) that implement network communication devices, e.g., packet switches. Such ICs typically require placement of a very large number of I/O blocks on the IC periphery. Generally, however, the disclosed techniques are useful for floorplanning of any other suitable type of IC.

In an embodiment, floorplanning comprises three stages, wherein, in the first stage ("instance generation"), the processor groups together combinations of interface blocks; in the second stage ("horizontal extension"), the processor fits interface blocks along the south and/or north edges of the IC; and, in the third stage the processor places the remaining interface blocks along the east and/or the west edges of the IC. (The terms "horizontal", "vertical", "north", "south", "east" and "west" are used merely as references to the edges and axes of the IC, and do not mandate any absolute orientation.) Since each stage involves multiple invocations, and since the package is determined by the placement of the interface blocks, the disclosed three-stage process generates a cost optimized floor-plan-package-select solution.

In another embodiment that is disclosed herein, the tool further comprises a package design algorithm, to allocate balls in a selected Ball Grid Array (BGA) package.

In an embodiment of the present invention, a computer system generates a floorplan that optimizes the IC cost, including both die cost and packet cost. The system methodically generates candidate floorplans, until an optimal floorplan is found.

Figure 1:
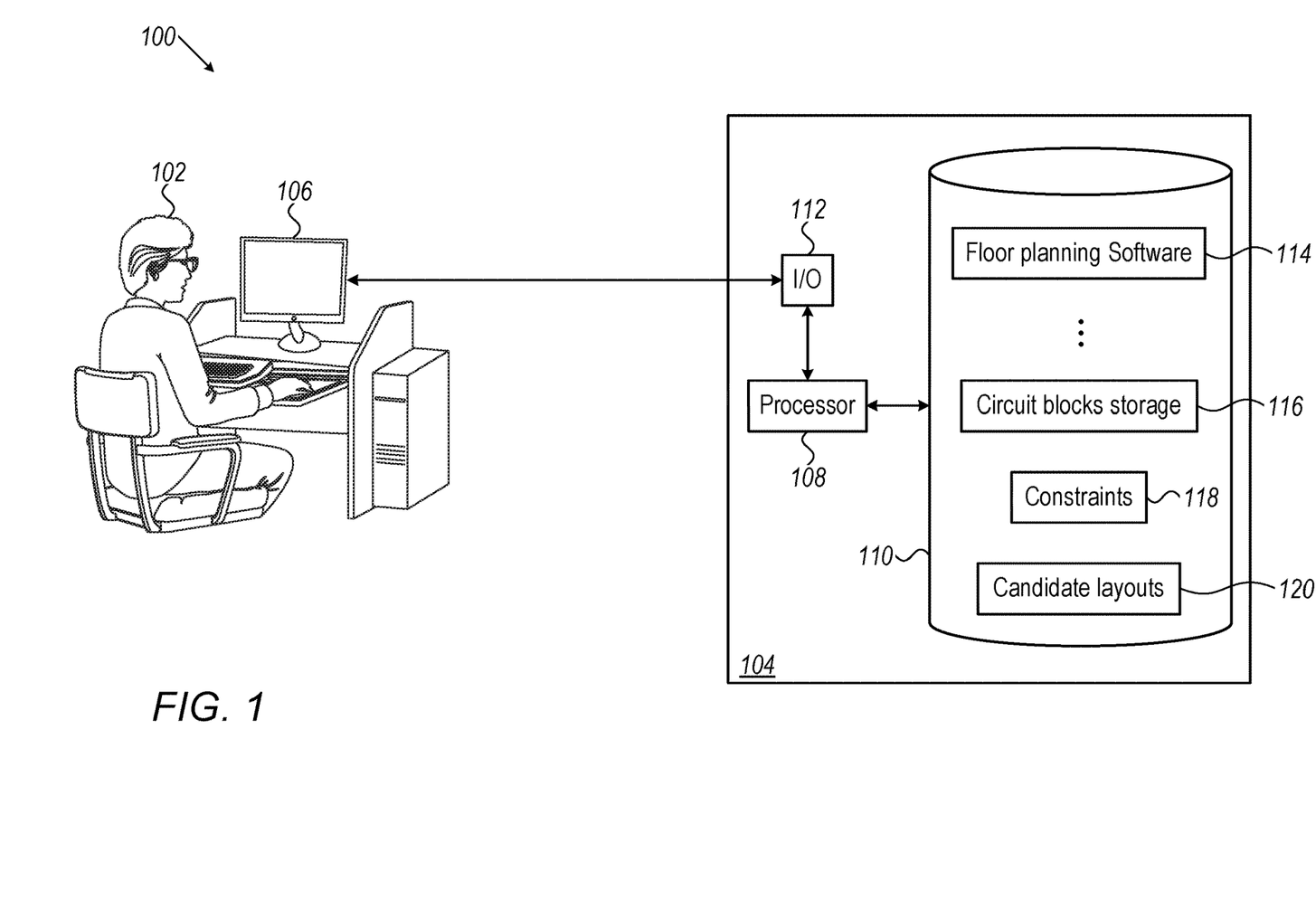
FIG. 1 is a block diagram that schematically illustrates a system for designing an electronic device, in accordance with an embodiment that is described herein.

FIG. 1 is a block diagram that schematically illustrates a system 100 for designing an electronic device, in accordance with an embodiment that is described herein. A User 102 communicates with a computer system 104 through a terminal 106. Computer system 104 comprises a processor 106, a memory 110 and an I/O subsystem 112 that is coupled to terminal 106. The user enters a list of I/O IP cores (will be referred to as "interface blocks" or "I/O blocks" hereinbelow), the IC contents and a set of constraints (if any). The list of interface blocks, the IC contents and the set of constraints are collectively referred to as the user's Requirement.

In embodiments, processor 108 may comprise one or more general purpose processors (CPUs), as well as specialized computing cores. In some embodiments, computer system 104 communicates (via a network connection that is not shown) with a remote computing resource, such as cloud computing resource.

Memory 110 may comprise a program store 114 that is configured to store the floorplanning software, and a circuit blocks storage 116 that is configured to store circuit blocks such as interface blocks and the provided IC contents block.

The placement of the various interface blocks in the floorplan should follow a set of constraints. For example, a Serializer/Deserializer (SERDES) circuit block should be placed in proximity to suitable differential-signal input and output ports; some noisy interface blocks should be placed remotely from interface blocks that are specified as sensitive to noise, etc. In embodiments, the set of constraints may be stored in a Constraints storage 118 of memory 110

To achieve an optimized floorplan, the floorplanning software steps through three distinct stages to derive the floorplan, and then through a package design step, to design the required package. During the various steps, the software generates candidate layouts, which are temporarily stored in a candidate-layouts storage 120.

Figure 2:
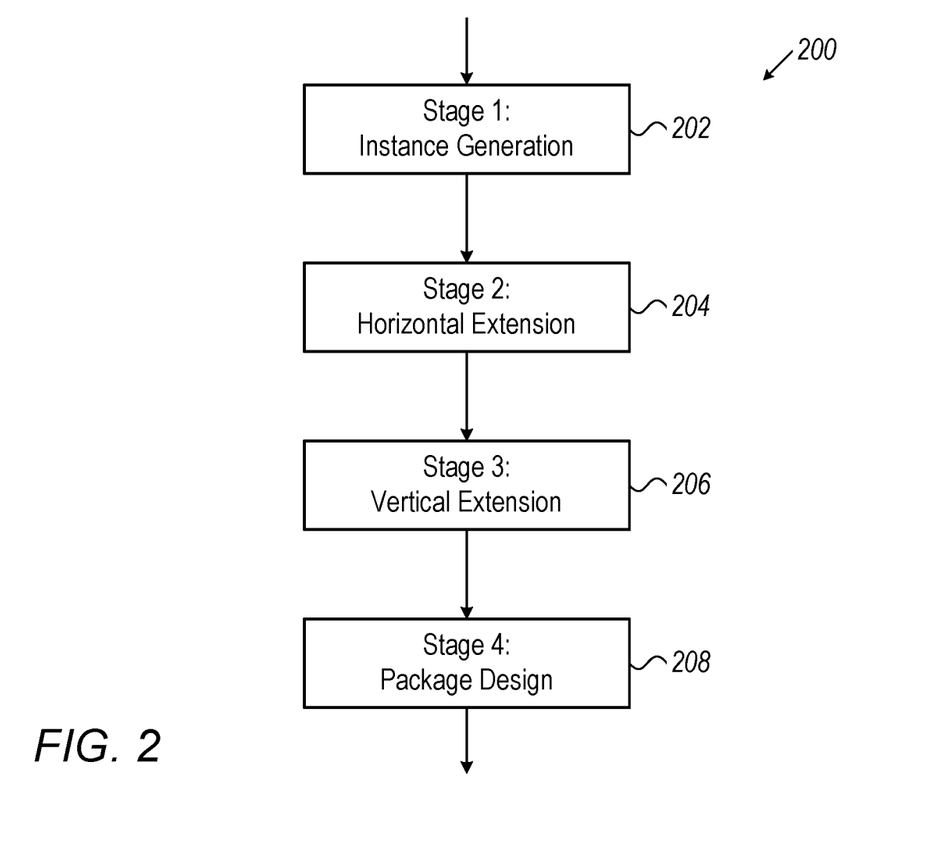
FIG. 2 is a flowchart that schematically illustrates a method for floorplanning an integrated circuit, in accordance with an embodiment that is described herein.

FIG. 2 is a flowchart 200 that schematically illustrates a method for floorplanning of an integrated circuit, in accordance with an embodiment that is described herein. The flowchart is executed by processor 108 (FIG. 1), that runs floorplanning software 114.

In various embodiments, the floorplanning techniques comprise four stages. In an Instance-generation stage 202, the processor prepares a list of Interface blocks and (optionally) prepares a constraint list. The list of interface blocks, which are predefined circuits used to interface with various input/output standards, is typically preset for a given process technology. The constraints typically are derived by the interface blocks (e.g., a SERDES interface block should be placed near differential input/output driver pads) but may also be derived by the user (e.g., place a given interface block next to a preset point in the IC contents block).

In a horizontal-extension stage 204, the processor places interface blocks along a first axis of the IC layout. A first axis of the IC will be referred to herein arbitrarily as a horizontal axis, including a north edge and a south edge of the IC; the orthogonal axis will be referred to as the vertical axis, including the east and the west edges of the IC (sometimes the horizontal axis will be referred to as the x-dimension, and the vertical axis as the y dimension). In the horizontal extension stage the processor adds interface blocks in both the north and the south edges, until a maximum x dimension is reached (the maximum value for the X dimension is, in some embodiments, defined in the constraints list; in other embodiments the maximum x dimension may be preset). All valid results ("candidate layouts") are passed to the next stage.

In a vertical-extension stage 206, the processor starts with candidate layouts resulting from stage 2 and then places the remaining interface blocks along the east and the west edges (in embodiments, only one of the east and west edges is populated, resulting in an IC with three populated edges). The vertical extension continues until all interface blocks are placed; several combinations may be generated, and the processor estimates the total cost for each such combination, using an area/cost function that is preset for the given process technology, and using preset metrics to evaluate the package cost as a function of the I/O pad location. The combination (or several combination) with minimum cost is selected.

In embodiments, the number of evaluated combinations ("candidate layouts") may be large, in a typical embodiment more than 100,000 combinations may be evaluated; since the combinations include numerous package and die-size variations, the process described hereinabove may identify the optimal dies-size/package combination.

Lastly, at a package design stage 208, the processor, in an embodiment, designs the IC package according to the selected optimal layout.

Thus, according to the example embodiment illustrated in FIG. 2 and described hereinabove, a computer system jointly optimizes the die size and the package cost of an integrated circuit following a three-stage process; after the optimal layout is found, in a fourth stage the package is designed according to the selected optimal layout.

Figure 3:
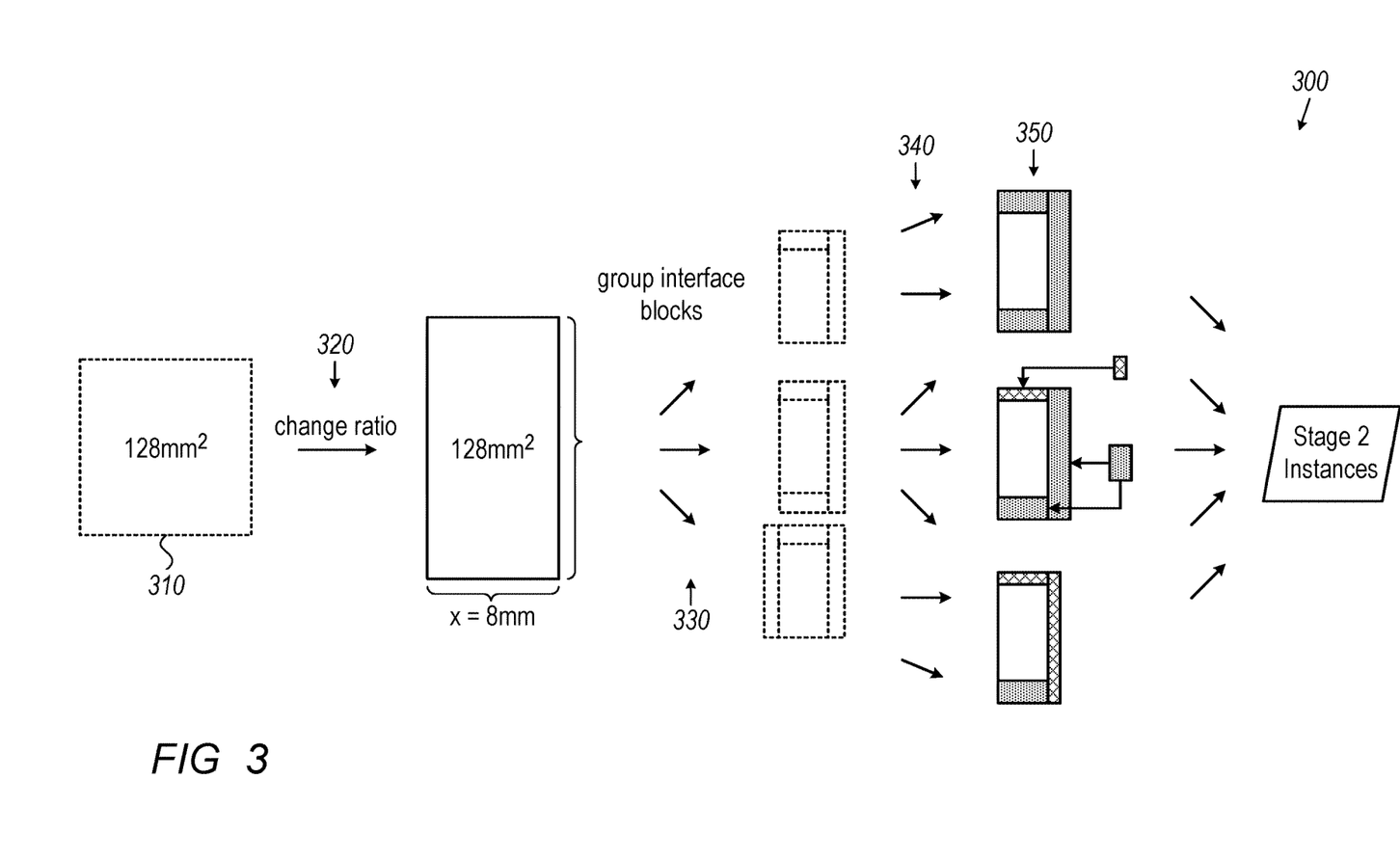
FIG. 3 is a flowchart that schematically illustrates a method for instance-generation (first floorplanning stage), in accordance with an embodiment that is described herein.

FIG. 3 is a flow diagram 300 that schematically illustrates a method for instance-generation (the first floorplanning stage), in accordance with an embodiment that is described herein. The flowchart is executed by processor 108 (FIG. 1).

In the embodiment depicted, the flowchart starts with a square IC-contents layout 310. The size is derived by a place-and-route analysis of the IC-contents input (o, in embodiments, the size of the IC-contents may be provided by the customer). In the illustrated example, the IC-contents size is 128 square millimeter (mm²), or approximately 11.3×11.3 mm. The processor then, in a change ratio operation 320, changes the ratio of the height and width of the IC-contents, initially to a predefined minimum (0.5 in the example embodiment illustrated in FIG. 3), to get an 8×16 layout. In further iterations, other ratios will be selected to generate more candidate layouts; for an example, in an embodiment, the processor may systematically iterate through all ratios from a minimum value to a maximum value, with a preset step.

The processor next, at a group interface blocks operation 320, creates groups of interface blocks, for example, interface blocks that share the same height; and then, at a Generate interconnected combinations stage 340, combines groups according to preset restrictions.

The operations of flowchart 300 are meant to generate an initial set of interconnected interface blocks to be used by further stages; the grouping decided by flowchart 300 may be changed (optimized) in further stages.

Figure 4:
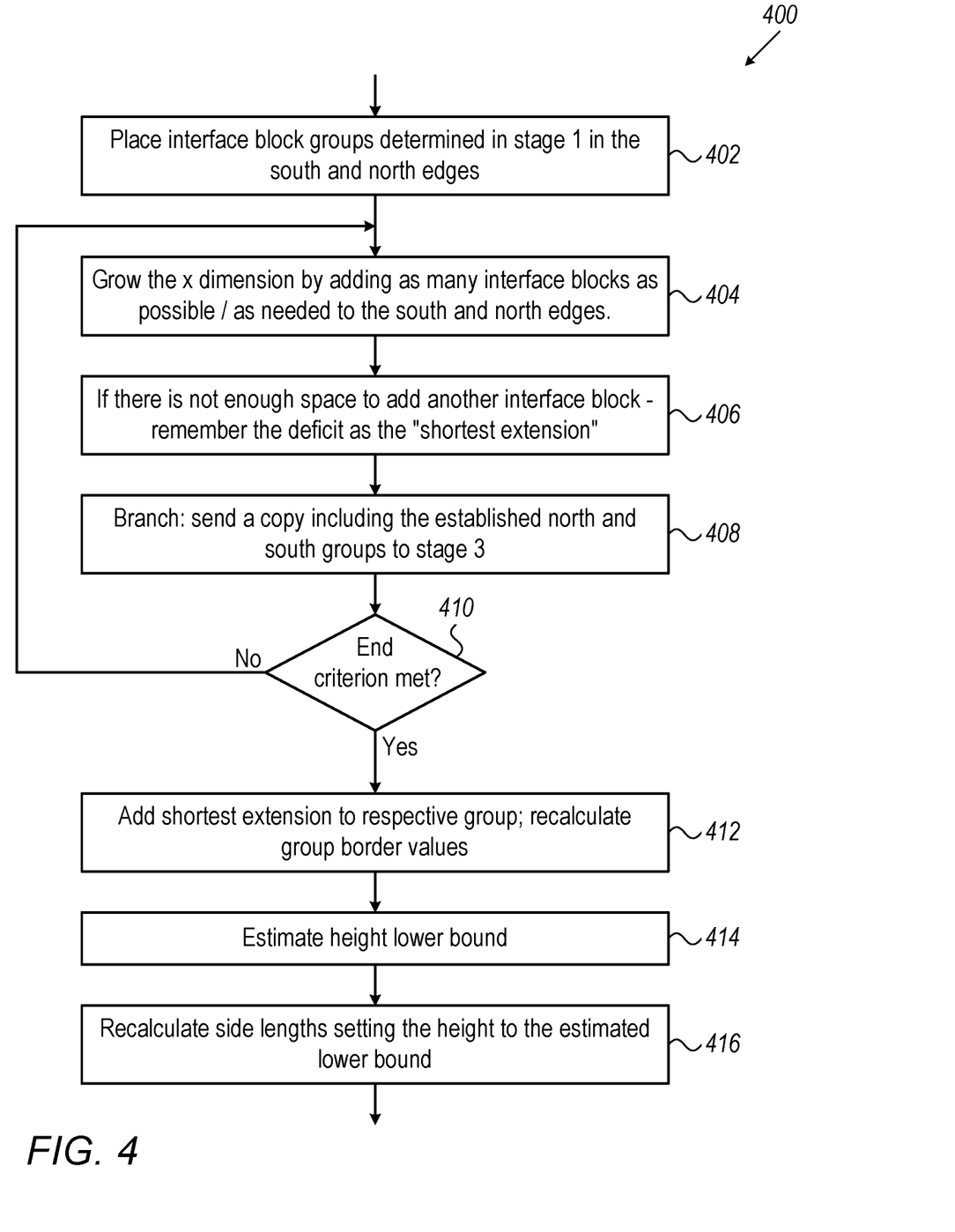
FIG. 4 is a flowchart that schematically illustrates a method for horizontal extension (second floorplanning stage), in accordance with an embodiment that is described herein.

FIG. 4 is a flowchart 400 that schematically illustrates a method for horizontal extension (the second floorplanning stage), in accordance with an embodiment that is described herein. The flowchart is executed by processor 108 (FIG. 1). The processor, at all times, keeps a list of interface blocks that have already been placed, and a list of interface blocks that are yet to be placed.

At an Initial Placement of Groups operation 402, the processor places the interface block groups determined in the first floorplanning stage along the south and north edges. Next, at a grow-x-dimension operation 404, the processor adds interface blocks until a preset x-dimension limit is reached in the south and north edges. When further growing is not possible, the processor, at a store-deficit operation 406, stores the deficit needed to fit another interface block in memory; this deficit will be used at a later stage to further extend the x dimension, according to the smallest deficit found in all iterations.

The processor now enters a Branch operation 408, wherein execution branches—the processor continues to evaluate additional x extensions in stage 2, but, concurrently, sends a copy of the established north and south groups to the vertical extension (third) floor planning stage.

Next, at a Check end-criteria operation 410, the processor checks if an end criterion has been matched. In some embodiments the criterion may be a number of iterations; in other embodiments performance-based criteria are employed.

If, in operation 410, the end criterion is not met, the processor reenters operation 404, and performs another x-dimension extension attempt. If the end criterion is met the processor enters an Add-shortest-extension operation 412 in which the processor adds the shortest extension of all candidate layouts to the respective group of interface blocks and recalculates the group border. Then, at an Estimate-lower-bound for height operation 414, the processor adds the shortest extension length to its respective group and recalculates all group border lengths. Lastly, in Recalculate Sides operation 416, the processor recalculates the side lengths of the candidate layouts, setting the height to the estimated low bound found in operation 414.

The remaining side-corrected candidate layouts are now forwarded to stage 3 processing. In a typical embodiment, the number of candidate layouts that the processor sends to stage three may be in the tens of thousands. In embodiments, the number of candidate layouts may change according to the complexity of the customer's input. For example, in embodiments wherein a large number of interface blocks are used, the number of candidate layouts may grow.

Figure 5:
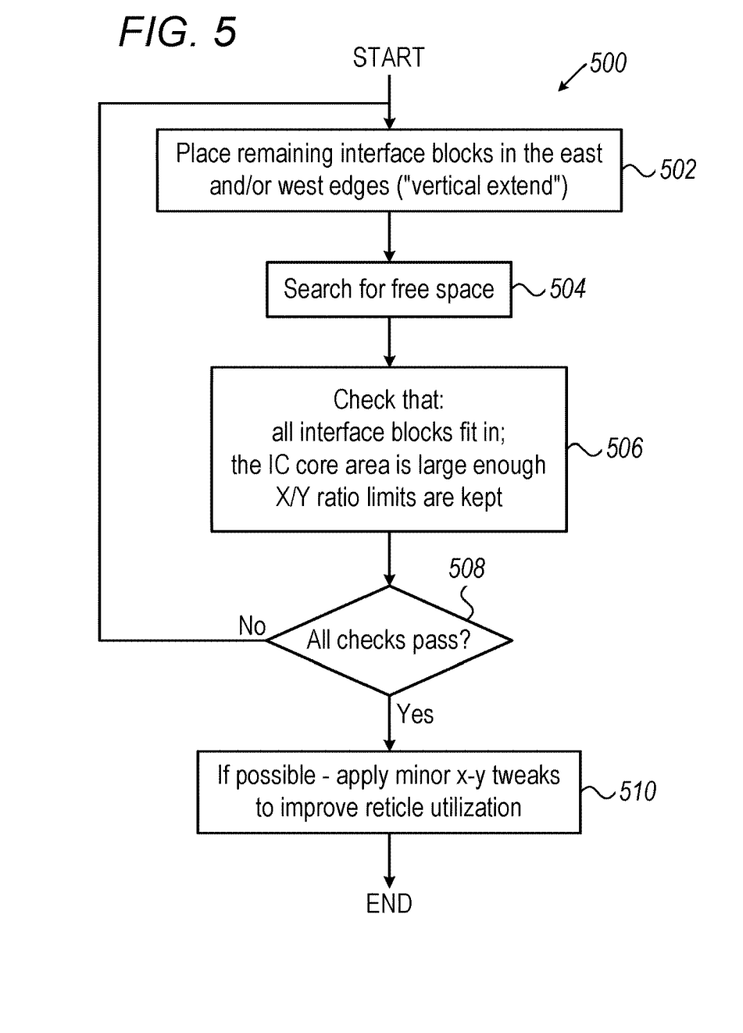
FIG. 5 is a flowchart that schematically illustrates a method for vertical extension (third floorplanning stage), in accordance with an embodiment that is described herein.

FIG. 5 is a flowchart that schematically illustrates a method 500 for vertical extension (the third floorplanning stage), in accordance with an embodiment that is described herein. The method is executed by processor 108 (FIG. 1). The method starts at a vertical extend operation 502, wherein the processor places interface blocks that have not been placed in stage 2, on the east and west edges of the IC. In some embodiments, only one of the east and west edges may be used, resulting in an IC with three populated sides.

Next, at a Search for free space operation 504, the processor searches for free space in the east or west edges, and, if found, adds interface block accordingly.

At a Check-done operation 508, the processor checks that all remaining interface blocks are placed. If this is not the case, the processor reenters operation 502, to for another vertical extension attempt. If, in operation 508, all interface blocks have been placed, floorplanning is completed. The processor then enters an Apply-tweaks operation 510, and attempts to apply minor x and y tweaks, including moving of interface blocks (by no more than several parts per 1000) to improve the reticle utilization.

Thus, according to flowcharts 300, 400 and 500, illustrated in FIGS. 3 through 5 and described hereinabove, a processor is able to systematically explore and optimize placement combinations of interface blocks along the periphery of the integrated circuit, using a three-stage process that comprises an instance generation stage, a horizontal extension stage and a vertical extensions stage.

The configuration of flowcharts 300, 400 and 500 illustrated in FIGS. 3,4, 5 and described hereinabove are examples that are cited merely for the sake of conceptual clarity. Other configurations may be used in alternative embodiments. For example, in some embodiments, the ratio of the die is determined by the IC contents block rather than set in operation 320 of flowchart 300. In an embodiment, the ratio is set in constraints store 118.

In some embodiments of the present invention, the floorplanning process described herein is coupled to a package design software that designs the package derived by the floorplanning process.

Figure 6:
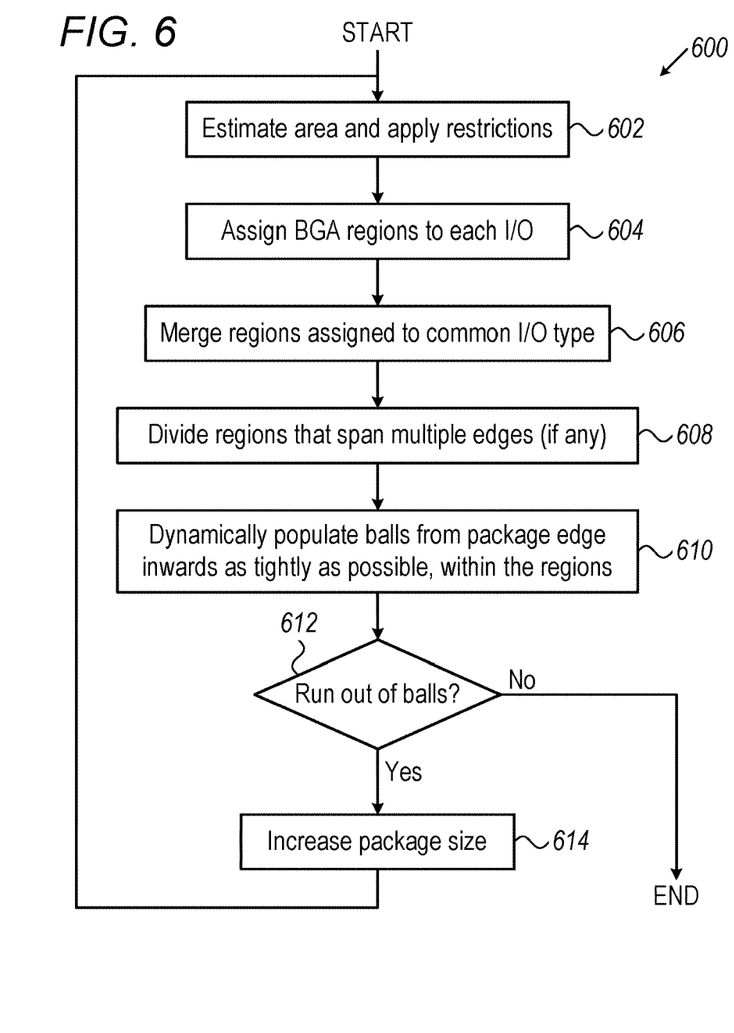
FIG. 6 is a flowchart that schematically illustrates a method for integrated circuit (IC) package design, in accordance with an embodiment that is described herein.

FIG. 6 is a flowchart that schematically illustrates a method 600 for IC package design, in accordance with an embodiment that is described herein. The flowchart is executed by processor 108 (FIG. 1).

The flowchart starts at an Estimate Area operation 602, wherein the processor estimates the array size based on the selected floorplan. In embodiments, the processor may, in this operation, also perform initial power and corner ball assignments, to allocate balls that are connected to a supply input as well as balls located at package corners.

Next, at an Assign-BGA Regions operation 604, the processor divides the BGA grid to geometrical regions and assigns BGA regions to interface circuits in order to allocate respective groups of the balls in the BGA to the interface circuits.

The processor then, at a Merge regions operation 606, merges regions that are assigned to common input/output (I/O) types, and at a Divide regions operation 608, divides regions that span multiple edges of the IC to single edge-regions (if any).

Now, at a Dynamic-Population operation 610, the processor incrementally allocates the balls, from the package edge inward, as tightly as possible (i.e., minimizing the number of skipped locations), in a converging spiral order, keeping track of the list of I/O blocks yet to be allocated to balls.

Next, at a check-done operation 612, the processor checks whether all interface blocks have been assigned to balls. If so, the process flow ends. If not all interface blocks have been assigned to balls, the processor, at an Increase package size operation 614, increases the size of the BGA package by a small amount (e.g., from N×N to (N+1)×(N+1)), and then reenters operation 602 for another I/O to balls allocation attempt.

Thus, according to the flowchart illustrated in FIG. 6 and described hereinabove, the processor may design an optimized package for the floorplan defined in stages one, two and three.

The package design technique described hereinabove is used for the design of BGA packages. The disclosed technique, however, is not limited to BGA packages and may be applied, mutatis mutandis, to other packaging technologies, such as Quad Flat Package (QFP) and others The configuration of computer system 100, the floorplanning method of flowchart 200, including stage one flowchart 300, stage 2 flowchart 400 and stage three flowchart 500 and the method of package design flowchart 600 are example configurations and methods that are shown purely for the sake of conceptual clarity. Any other suitable configurations and methods can be used in alternative embodiments.

In various embodiments, the various floorplanning stages and the package design flow may be carried out by hardware, by software, or by combination of hardware and software. In various embodiments, computer system 100 may be implemented using suitable hardware, such as one or more Application-Specific Integrated Circuits (ASIC) or Field-Programmable Gate Arrays (FPGA), or a combination of ASIC and FPGA.

Processor 108 may comprise one or more general-purpose processors, which are programmed in software to carry out the packet processing functions. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address floorplanning and package design of integrated circuits that implement network communication devices, the methods and systems described herein can also be used in integrated circuits that implement other functions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for designing placement locations for Input/Output (I/O) blocks in an electronic network device, the system comprising:
   an interface, configured to receive a requirement that specifies at least multiple Input/Output (I/O) blocks to be laid-out along a periphery of an electronic device that implements a network communication device; and
   a processor, configured to:
      generate a plurality of candidate layouts for the electronic device, the candidate layouts differing from one another at least in an arrangement of the specified I/O blocks along the periphery;
      estimate respective costs associated with at least some of the candidate layouts; and
      present at least some of the candidate layouts and the respective estimated costs to a user.

2. The system according to claim 1, wherein the I/O blocks are of multiple I/O types, and wherein the interface is configured to receive, for each type among the types, (i) a respective size of the I/O blocks of the type and (ii) a respective count of the I/O blocks of the type to be laid-out.

3. The system according to claim 1, wherein the requirement further specifies a minimal size of an interior of the electronic device, and wherein the processor is configured to generate the candidate layouts with interiors that meet the specified minimal size.

4. The system according to claim 1, wherein the processor is configured to generate two or more subsets of the candidate layouts, the subsets differing from one another in an aspect ratio of the electronic device.

5. The system according to claim 1,
wherein the periphery includes one or two first edges of the device along a first axis, and one or two second edges of the device along a second axis that is perpendicular to the first axis, and
wherein, in generating a given candidate layout, the processor is configured initially to populate the one or two first edges with selected ones of the I/O blocks, and subsequently to populate the one or two second edges with remaining I/O blocks.

6. The system according to claim 5, wherein the processor is configured to populate the one or two first edges until the one or two first edges are fully populated with the selected I/O blocks, and then proceed to populate the one or two second edges with the remaining I/O blocks.

7. The system according to claim 1, wherein the processor is configured to verify whether a given candidate layout passes a validity check, and, if the given candidate layout fails the validity check, to iteratively modify a parameter of the given candidate layout so as to meet the validity check.

8. The system according to claim 1, wherein the processor is further configured to select respective package types for the candidate layouts, and to estimate the respective costs sum costs of the candidate layouts and the respective package types.

9. The system according to claim 8, wherein the processor is configured to select a package type for a given candidate layout by determining a minimal package size that accommodates electrical interconnections required by the I/O blocks laid-out in the given candidate layout.

10. The system according to claim 8, wherein the processor is configured to identify a subset of the candidate layouts and respective package types having lowest sum costs.

11. A method for designing placement locations for Input/Output (I/O) blocks in an electronic network device, the method comprising:
receiving a requirement that specifies at least multiple Input/Output (I/O) blocks to be laid-out along a periphery of an electronic device that implements a network communication device;
generating a plurality of candidate layouts for the electronic device, the candidate layouts differing from one another at least in an arrangement of the specified I/O blocks along the periphery;
estimating respective costs associated with at least some of the candidate layouts; and
presenting at least some of the candidate layouts and the respective estimated costs to a user.

12. The method according to claim 11, wherein the I/O blocks are of multiple I/O types, and wherein receiving the requirement comprises receiving, for each type among the types, (i) a respective size of the I/O blocks of the type and (ii) a respective count of the I/O blocks of the type to be laid-out.

13. The method according to claim 11, wherein receiving the requirement further comprises receiving a minimal size of an interior of the electronic device, and wherein generating the candidate layouts comprises generating the candidate layouts with interiors that meet the specified minimal size.

14. The method according to claim 11, wherein generating the candidate layouts comprises generating two or more subsets of the candidate layouts, the subsets differing from one another in an aspect ratio of the electronic device.

15. The method according to claim 11,
wherein the periphery includes one or two first edges of the device along a first axis, and one or two second edges of the device along a second axis that is perpendicular to the first axis, and
wherein generating the candidate layouts comprises, in a given candidate layout, initially populating the one or two first edges with selected ones of the I/O blocks, and subsequently to populating the one or two second edges with remaining I/O blocks.

16. The method according to claim 15, wherein generating the candidate layouts comprises, in the given candidate layout, populating the one or two first edges until the one or two first edges are fully populated with the selected I/O blocks, and then proceeding to populate the one or two second edges with the remaining I/O blocks.

17. The method according to claim 11, wherein generating the candidate layouts comprises verifying whether a given candidate layout passes a validity check, and, if the given candidate layout fails the validity check, iteratively modifying a parameter of the given candidate layout so as to meet the validity check.

18. The method according to claim 11, further comprising selecting respective package types for the candidate layouts, and estimating the respective costs as sum costs of the candidate layouts and the respective package types.

19. The method according to claim 18, wherein selecting the package types comprises selecting a package type for a given candidate layout by determining a minimal package size that accommodates electrical interconnections required by the I/O blocks laid-out in the given candidate layout.

20. The method according to claim 18, wherein estimating the costs comprises identifying a subset of the candidate layouts and respective package types having lowest sum costs.

* * * * *